United States Patent Office

2,753,340
Patented July 3, 1956

2,753,340

MALEATE SALTS OF PROTOVERATRINE A AND PROTOVERATRINE B

Elmer H. Stuart, Indianapolis, Ind., assignor to Eli Lilly and Company, Indianapolis, Ind., a corporation of Indiana No Drawing. Application May 8, 1953,
Serial No. 353,893

4 Claims. (Cl. 260—236)

This invention relates to stable salts of protoveratrine alkaloids and more particularly to protoveratrine A maleate and protoveratrine B maleate.

Protoveratrine of commerce usually consists of protoveratrine A and an amount up to about fifty percent of protoveratrine B. Recently these alkaloids have come into prominence because of their hypotensive properties whereby effective blood pressure lowering can be secured in hypertensive persons.

A disadvantage in the use of aqueous therapeutic preparations containing either or both of the above alkaloids lies in the relative instability of the salts of those alkaloids. The instability is such that aqueous preparations in ready-to-use form cannot be provided to the trade with assurance that the preparations will maintain their original potency.

I have discovered that I can provide relatively stable salts of protoveratrine A and protoveratrine B suitable for incorporation into aqueous vehicles, by converting the alkaloid bases into their acid maleate salts.

The acid maleate salts of protoveratrine A and protoveratrine B, unlike the alkaloid bases, are appreciably soluble in water, and unlike the other known salts of the bases, are quite stable in aqueous solution. The stability of the salts is such that their aqueous solutions retain their full potency over long periods of time, and even withstand sterilization by autoclaving with superheated steam, or by boiling for a period of about one hour on each of three successive days. Furthermore, aqueous solutions containing the salts have a pH of about 4.5 to 6.0 in contrast to the relatively low pH of 1 or 2 possessed by the salts made from commonly used strong acids. Consequently, parenteral preparations containing my novel salts are better tolerated and cause less pain on administration than do those preparations containing salts of the commonly used strong acids.

My novel salts are readily prepared from the pure alkaloids by mixing molar equivalent quantities of the alkaloid base and maleic acid in water and evaporating the mixture to dryness, or alternatively, by reacting the equivalent quantities of alkaloid base and maleic acid in a suitable organic solvent in which the alkaloid base and maleic acid are relatively soluble, and then crystallizing the resulting alkaloid acid addition salt as by allowing the solution to stand, or by reducing the volume of the solvent, or by the addition of a miscible solvent in which the alkaloid salt is substantially insoluble.

For the preparation of physiologically useful compositions it is more economical to start with crude alkaloid, for example, a mixture of protoveratrine A and protoveratrine B, or even crude alkaloidal plant material such as the root and rhizomes of Veratrum album. From the plant material a mixture of alkaloids or any specific alkaloid can be obtained by known extractive and crystallization procedures. Illustratively, a suitable procedure for obtaining an alkaloid mixture comprises the following: The root and rhizomes of the plant are ground and moistened, and the mixture is made slightly alkaline. The alkaline mixture is percolated with benzene. The benzene percolate containing the alkaloids is extracted with dilute aqueous acid, and the acid extract is made alkaline and is extracted with ethylene dichloride. The ethylene dichloride solution is evaporated to dryness, leaving as a residue a crude mixture of alkaloids containing protoveratrine A and protoveratrine B, together with considerable amounts of the plant's other alkaloidal constituents. The residue is dissolved in anhydrous ether, and is allowed to stand at room temperature, whereupon the protoveratrine A and protoveratrine B contained in the mixture precipitate preferentially to the other alkaloid constituents. The precipitated alkaloids can then be further purified by the commonly used recrystallization procedures.

More advantageously, the precipitated alkaloids are both purified and converted into a substantially pure mixture of the acid maleate salts of protoveratrine A and protoveratrine B by dissolving the crude alkaloid mixture in ethylene dichloride, and adding thereto as a concentrated solution in acetone a molar equivalent amount of maleic acid. From the mixed solution, the maleic acid addition salts of protoveratrine A and protoveratrine B crystallize in substantially pure form.

The following examples further illustrate this invention.

EXAMPLE 1

*Preparation of protoveratrine A acid maleate*

To 8 g. (0.1 mol) of substantially pure protoveratrine A base dissolved in 80 ml. of ethylene dichloride are added 1.1 g. (0.11 mol) of maleic acid dissolved in 4 ml. of acetone. The mixture is allowed to stand in the cold whereupon protoveratrine A acid maleate crystallizes in a yield of about 90 percent of theory. The crystals are filtered off and dried in vacuo at about 50° C. Protoveratrine A acid maleate melts at about 241.5° C. (with decomposition). The optical rotation (1 percent in pyridine) is as follows: $\alpha_D^{20°} = -37.6°$.

EXAMPLE 2

*Preparation of protoveratrine B acid maleate*

To a solution of 10 g. (.014 mol) of substantially pure protoveratrine B base in 30 ml. of chloroform are added 1.4 g. (.014 mol) of maleic acid dissolved in 40 ml. of ether. An additional 100 ml. of ether is then added. The mixture is allowed to stand in the cold, whereupon protoveratrine B acid maleate separates in crystalline form in a yield upwards of 85 percent of theory. The crystals are filtered off and dried in vacuo at about 50° C. Protoveratrine B acid maleate melts at about 222.2° C. (with decomposition). The optical rotation (1 percent in pyridine) is as follows: $\alpha_D^{25°} = -27.3°$.

EXAMPLE 3

*Preparation of acid maleate salt of alkaloid mixture*

40 g. of a mixture comprising relatively crude protoveratrine A and protoveratrine B together with minor amounts of other protoveratrine alkaloids are dissolved in 400 ml. of ethylene dichloride. To the solution are added 5 g. of maleic acid dissolved in 20 ml. of acetone. The mixture is well stirred, and allowed to stand for about 24 hours. During the standing period about 40 g. of a crystalline mixture of the acid maleate salts of protoveratrine A and protoveratrine B separate from the solution. The mixture of salts is filtered off and dried. The mixture consists substantially of protoveratrine A acid maleate and protoveratrine B acid maleate, and is sufficiently pure for employment in pharmaceutical preparations.

Aqueous solutions of protoveratrine A acid maleate, protoveratrine B acid maleate or mixtures thereof, which solutions are suitable for parenteral administration, are provided by dissolving the alkaloidal maleate in water in the amount of about 100 mcg. per ml., and sterilizing and ampouling the solution. The exact dosage of a solution of the above character to be administered for the control of hypertension is determined by the particular needs of the patient.

The alkaloidal maleate can also be provided in tablet form, suitable tablets comprising of 500 mcg. quantities of alkaloids together with suitable excipients. Desirably, the tablets are scored so that they can readily be broken for administration of alkaloid salt in amount less than that contained in the entire tablet.

I claim:

1. The acid maleate salt of an alkaloid of the group consisting of protoveratrine A and protoveratrine B.

2. Protoveratrine A acid maleate.

3. Protoveratrine B acid maleate.

4. The method of preparing an acid maleate salt of an alkaloid of the group consisting of protoveratrine A and protoveratrine B which comprises dissolving the alkaloid base in ethylene dichloride, and adding thereto a solution in acetone of an equimolar equivalent amount of maleic acid, and separating the crystalline alkaloid salt which precipitates.

References Cited in the file of this patent

Craig et al.: J. Biol. Chem., vol. 143, pp. 427–432 (1942).